US012157973B2

(12) United States Patent
Virtanen et al.

(10) Patent No.: US 12,157,973 B2
(45) Date of Patent: Dec. 3, 2024

(54) APPARATUS AND METHOD FOR PROCESSING A SUSPENSION COMPRISING ORGANIC MATERIAL AND LIQUID

(71) Applicant: CELLWOOD MACHINERY, Nässjö (SE)

(72) Inventors: Stefan Virtanen, Nässjö (SE); Dan Rombo, Bodafors (SE)

(73) Assignee: CELLWOOD MACHINERY, Nässjö (SE)

( * ) Notice: Subject to any disclaimer, the term of this patent is extended or adjusted under 35 U.S.C. 154(b) by 254 days.

(21) Appl. No.: 17/918,923

(22) PCT Filed: Apr. 13, 2021

(86) PCT No.: PCT/EP2021/059555
§ 371 (c)(1),
(2) Date: Oct. 14, 2022

(87) PCT Pub. No.: WO2021/209447
PCT Pub. Date: Oct. 21, 2021

(65) Prior Publication Data

US 2023/0235506 A1 Jul. 27, 2023

(30) Foreign Application Priority Data

Apr. 17, 2020 (EP) .................................... 20170192

(51) Int. Cl.
*B30B 9/14* (2006.01)
*B30B 9/12* (2006.01)
(Continued)

(52) U.S. Cl.
CPC .................. *D21B 1/02* (2013.01); *B30B 9/12* (2013.01); *B30B 9/14* (2013.01); *D21C 9/18* (2013.01)

(58) Field of Classification Search
CPC .. B30B 9/12; B30B 9/122; B30B 9/14; B30B 9/16; B30B 11/24; B30B 11/243;
(Continued)

(56) References Cited

U.S. PATENT DOCUMENTS

| | | | | |
|---|---|---|---|---|
| 6,854,382 | B2 * | 2/2005 | Jan ........................ | A47J 19/025 99/509 |
| 7,357,074 | B2 | 4/2008 | Kraft et al. | |

(Continued)

FOREIGN PATENT DOCUMENTS

| | | | |
|---|---|---|---|
| CN | 109476107 | A | 3/2019 |
| EP | 3330068 | A1 | 6/2018 |

OTHER PUBLICATIONS

International Search Report (Jul. 2, 2021) for corresponding International App. PCT/EP2021/059555.

(Continued)

*Primary Examiner* — Jimmy T Nguyen
(74) *Attorney, Agent, or Firm* — WRB-IP PLLC

(57) ABSTRACT

An apparatus for processing a suspension including organic material and liquid, including a housing including an inlet and an outlet; a container arranged within the housing; a screw including a screw shaft and flights arranged within the container; a space defined between the screw and the container, through which the suspension is longitudinally transportable by a rotation of the screw. Further, the container includes a longitudinally extending first part and a longitudinally extending second part; the first part including a beveled edge the second part including a sharp edge whereby an anti-rotation tooth is generated on the inner surface of the container. A method for processing the suspension is also provided.

14 Claims, 7 Drawing Sheets

(51) Int. Cl.
*D21B 1/02* (2006.01)
*D21C 9/18* (2006.01)

(58) Field of Classification Search
CPC ....... B30B 11/245; B30B 11/248; D21B 1/02; D21B 1/12; D21C 9/18
USPC .................................................... 100/37, 117
See application file for complete search history.

(56) References Cited

U.S. PATENT DOCUMENTS

| | | | |
|---|---|---|---|
| 2002/0050214 | A1 | 5/2002 | Thibodeau |
| 2006/0196370 | A1 | 9/2006 | Kraft et al. |
| 2010/0186609 | A1 | 7/2010 | Svedberg |
| 2017/0087788 | A1 | 3/2017 | Oertig et al. |
| 2018/0154599 | A1 | 6/2018 | Ulm |

OTHER PUBLICATIONS

Chinese Official Action (translation) (Sep. 4, 2024) for corresponding Chinese App. 202180028977-2.

* cited by examiner

APPARATUS AND METHOD FOR PROCESSING A SUSPENSION COMPRISING ORGANIC MATERIAL AND LIQUID

BACKGROUND AND SUMMARY

The present disclosure relates generally to apparatuses and methods for processing a suspension comprising an organic material, such as wood byproducts or recycled paper, and liquid.

An apparatus for processing of a suspension comprising an organic material, such as cellulosic material and liquid, has been used in many industries, such as pulp and paper industries and for dewatering of sludge. One important step is to remove liquid from the suspension which can be achieved by the use of a screw press.

A screw press usually consists of a screw surrounded by cylinders having perforations. The screw rotation conveys the suspension from an inlet to an outlet. During this transportation, the liquid is filtrated through the perforations of the cylinder and the organic material suspension is therefore concentrated at the outlet.

Typically, the suspension comprising an organic material and liquid enters the inlet of the screw press having about 5-10% by weight organic material, e.g. fiber, concentration. At the end of the process, the fiber concentration can reach about 30% by weight or more. Pressing the material in a screw press is usually one of many steps in a production line of the paper treatment. For instance, the concentrated suspension comprising an organic material can be shredded into fine pieces by a shredder, ensuring a uniform and fine pulp. This material can be subjected to a heating zone, where the contaminants' strength properties are weakened. The resulting suspension can be subject to a dispenser to disintegrate any impurities to a minimum size. In many cases, the system has a bleaching step to increase the whiteness of the final product. The screw press can also be positioned in other production lines, for instance in a stock preparation line and sludge lines.

It is known that one of the drawbacks of such screw presses is that the suspension may rotate relative to the cylinder during operation of the screw press, which reduces the overall performance of the process and can generate a blockage and/or vibration problem of the screw press. High maintenance costs, as well as complex operation are common problems that may affect the whole process.

Normally, anti-rotation devices for hindering such rotation are formed as bars arranged on the inner surface of the perforated cylinders. The disadvantage of these bars is that they generate a large gap between the screw flights and the perforated cylinder. Such a large gap makes the dewatering process less efficient. The bars are also fitted in grooves in the inner surface, which results in an expensive solution. Other anti-rotation devices are formed as grooves milled in the inner surface of the perforated cylinders. The milled grooves give the disadvantage to the screw press of reduced dewatering, as there are no perforations at the milled grooves. Further, milling of the grooves requires a lot of extra machining of the screw press, which makes the screw press less cost-efficient.

It is desirable to address at least one of the above-mentioned problems. Accordingly, an aspect of the present invention preferably seeks to mitigate, alleviate or eliminate one or more of the above-identified deficiencies in the art and disadvantages singly or in any combination and solves at least one of the above-mentioned problems by providing an apparatus for processing a suspension comprising an organic material and liquid comprising a housing comprising an inlet at a first end for receiving the suspension, and an outlet at a second end for discharging the suspension. The apparatus further comprises a container arranged within the housing. Further, a screw comprising a screw shaft and flights is arranged within the container, the screw shaft defining a rotational axis along a longitudinal extension of the apparatus, the apparatus extending from the first to the second end. Further, a space is defined between the screw and the container, through which the suspension is longitudinally transportable from the first end to the second end by a rotation of the screw, the screw and the container being so arranged that the space is tapered from the first end to the second end. Further, the container comprises a longitudinally extending first part and a longitudinally extending second part which are assembled into longitudinally extending first and second connections between the first part and the second part. Further, the first part comprises a beveled edge at the first connection, the second part comprises a sharp edge at the first connection; whereby the first connection between the first part and second part generating a tooth on the inner surface of the container, wherein the tooth is adapted to reduce a rotation of the organic material suspension.

A method for processing a suspension comprising an organic material and liquid using an apparatus as described above is also provided.

It is desirable to provide an apparatus for processing a suspension comprising an organic material and liquid with an increased efficiency. It is also desirable to provide an apparatus that at least reduces the rotation of the suspension during its operation. It is also desirable to provide a simple way to replace at least part of the apparatus, preferably the edge responsible for the anti-rotation of the suspension. The apparatus may be a screw press or a plug screw.

The tooth comprising a sharp edge and a beveled edge has surprisingly shown to provide at least a reduction of the rotation of the suspension comprising an organic material and liquid in relation to the container. Such reduction of the rotation of the suspension provides an improved performance of the apparatus. Such reduction of the rotation of the suspension advantageously provides a better transportation of the suspension through the apparatus.

According to one exemplary embodiment, the container further comprises a plurality of perforations whereby the liquid from the suspension received at the inlet is displaceable out of the container and the concentrated organic material is discharged at the outlet. Due to the perforations of the container, as well as the tapered shape of the space between the screw and the container, liquid is pressed out of the container and thereby more concentrated organic material is discharged at the outlet than initially received at the inlet of the apparatus.

According to one exemplary embodiment, the first part further comprises a sharp edge at the second connection and the second part further comprises a beveled edge at the second connection, whereby the second connection comprises a second tooth. The presence of a second tooth at the second connection also provides a reduction of the rotation of the suspension comprising an organic material. The tooth advantageously provides a simplification of the apparatus since there is no need of adaptation of the diameter of the screw due to the presence of the teeth. The tooth provides a reduction of the rotation of the suspension without the need of reducing the diameter of the screw since no protuberance, such as bars, is arranged on the inner surface of the container.

According to one exemplary embodiment, the tooth generated on the inner surface of the container is only located on part of the longitudinal extension of the container, preferably adjacent to the second end.

According to another exemplary embodiment, the screw shaft is a tapered screw shaft, which tapers from the second end to the first end. Further, the height of the flights of the screw are gradually increasing from the second to the first end so that the screw, including the shaft and its flights, has a substantially constant cross-sectional diameter from the first to the second end. The screw shaft may also comprise gradually narrowing flight pitches in a direction from the first end to the second end. Further, the container has a cylindrical shape and together with the tapered screw shaft may provide a reduction of the space between the screw and the container. When the container has perforations, the tapered screw shaft and cylindrical container may together increase the separation of liquid from the suspension by reducing the space between the screw and the container, therefore squeezing the suspension and removing at least part of the liquid through the perforations. In this exemplary embodiment, the container would normally have an inner diameter just larger than the diameter of the screw. With such an arrangement, the screw would transport any suspension situated in the cylinder efficiently from the first end to the second end, when rotated. According to an alternative embodiment, the container is tapered from the first end to the second end and the screw shaft is a cylindrical screw shaft. The same technical effect of squeezing the suspension and removing at least part of the liquid is obtained by this alternative embodiment. This alternative embodiment may also be used for a plug screw, which does not have any perforations in its container for removing liquid.

According to one embodiment, the connections further comprise a replaceable wear plate comprising a sharp edge, the wear plate being arranged between the first part and the second part. According to a variant of this embodiment, the wear plate material may be selected from variants of different steel qualities, preferably with good wear resistance. The wear plates may also be equipped with different types of hard metals and/or hard coatings. The wear plate may be attached to the sharp edge of the second part. By such wear plates, the wear plate takes the role of the sharp edge of the second part in reducing the rotation of the suspension. Also, the wear plate protects the sharp edge of the second part from being worn. Further, when the wear plate becomes worn down, after extensive use, the wear plate can be easily exchanged to a new wear plate.

According to another exemplary embodiment, the beveled edge of the first part bears against the sharp edge of the second part. The resulting tooth generated at the connection between the first part and second partly reduces or abolishes the rotation of the suspension. The reduction of the rotation of the suspension may be achieved through the whole connection between the first part and second part of the container.

According to one exemplary embodiment, the container further comprises one or a plurality of longitudinally/axially extending container units arranged end to end.

According to another embodiment, the beveled edge may comprise a variety of shapes and/or angles. The shape and angles may be adapted for improving the rotation prevention.

According to another aspect, a method for processing a suspension comprising an organic material and liquid in an apparatus according to the aspect above is provided. The method comprises adding a suspension comprising an organic material and liquid in the inlet, conveying the suspension from the first end to the second end through the space by rotation of the screw, and collecting the suspension at the outlet, wherein as the suspension is conveyed, a radial rotation of the suspension in relation to the container is at least reduced by the tooth.

According to one embodiment, the container comprises a plurality of perforations through which at least a part of the liquid is separated from the suspension as the suspension is conveyed from the first end to the second end.

The suspension comprising an organic material and liquid comprises for instance recycled paper, pulp, sawdust, wood shavings, or wood chips, sludge or slurry. The suspension collected at the outlet may have a fiber concentration from 15 to 40% by weight, preferably from 25 to 35% by weight.

The method for processing a suspension comprising an organic material and liquid, according to the previous embodiment, may be performed in an apparatus according to any of the previous embodiments.

Further advantageous embodiments and features will be apparent from the detailed description below.

DETAILED DESCRIPTION

Figure 1A:
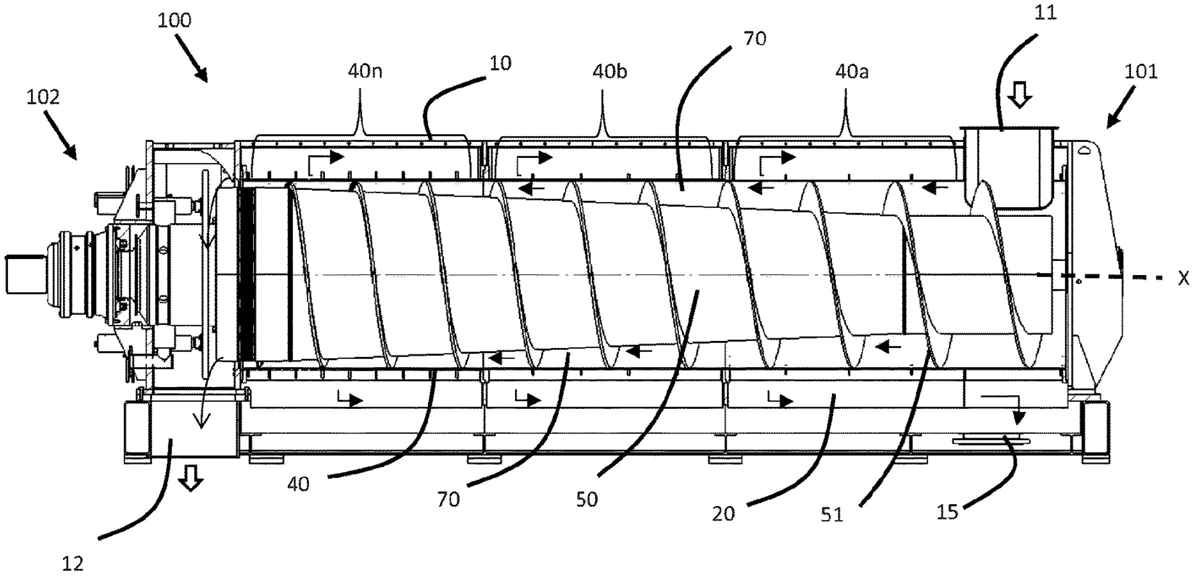
FIG. 1*a* is a side view and FIG. 1*b* is a perspective view of an apparatus for processing the suspension comprising an organic material and liquid, according to one embodiment.
Figure 1B:
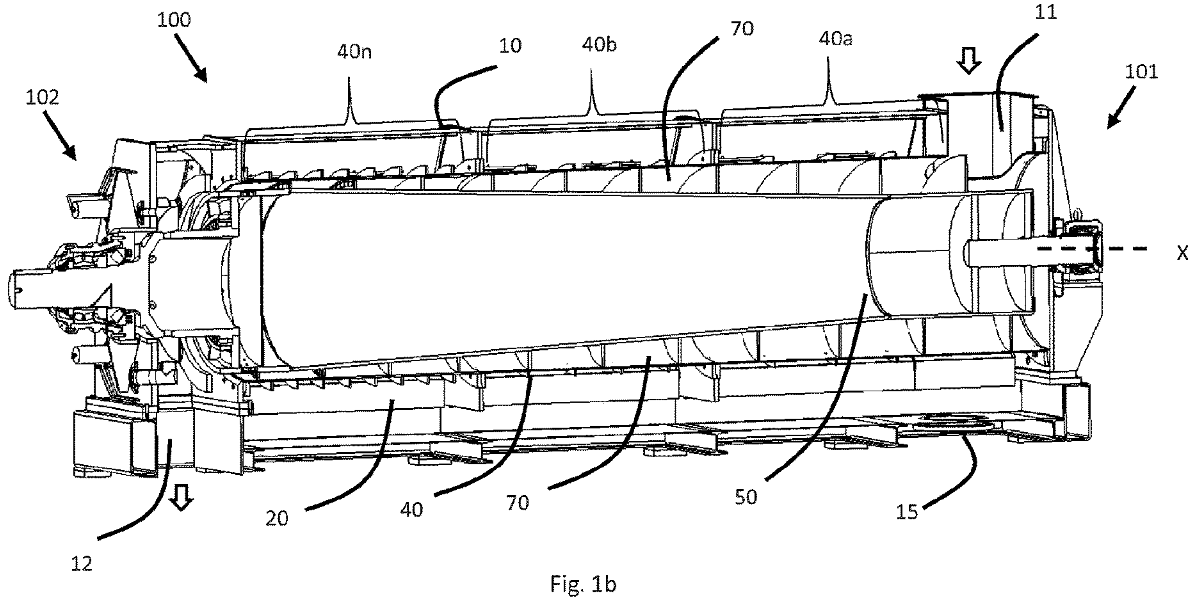

FIGS. 1*a* and 1*b* shows a partially sectioned longitudinal view of an apparatus 100 for processing a suspension comprising an organic material and liquid. The apparatus 100 may be a screw press. The apparatus 100 comprises a housing 10 comprising an inlet 11 at a first end 101 for receiving the suspension having a first concentration and an outlet 12 at a second end 102 for discharging the concentrated suspension. The inlet 11 at the first end 101 may directly receive suspension from a source or may be connected to another apparatus that feeds the inlet 11 at the first end 101 with the suspension. The outlet 12 at the second end 102 may discharge the concentrated suspension or may be connected to another apparatus for further processing of the suspension. The housing 10 may comprise one or more liquid outlets 15 to allow removal of liquid after separation from the suspension. In the example shown in FIG. 1*a*; the liquid outlet 15 is situated at the first end 101.

Further, a container 40 is arranged within the housing 10, the container 40 comprising a plurality of perforations 44 (seen in FIG. 2) whereby liquid is displaceable from the suspension. The suspension comprising an organic material and liquid may enter the container 40 through the inlet 11 at the first end 101 of the housing 10. A screw 50 comprising a screw shaft and flights 51 is arranged within the container 40. The screw flights 51 are also known as thread flanks or thread ridges of the screw 50. The screw shaft may define a rotational axis X along a longitudinal extension of the apparatus 100, the apparatus 100 extending from the first end 101 to the second end 102. The screw 50 may have an elongated extension along the rotational axis X, and may be connected to drive means for rotation of the screw 50. The screw 50 and the container 40 may be substantially coaxially arranged. A space 70 is defined between the screw 50 and the container 40. The space 70 may have an annular shape in a cross-section perpendicular to the rotational axis. The space 70 extends along the rotational axis. The suspension comprising an organic material is longitudinally transportable from the first end 101 to the second end 102 through the space 70 by a rotation of the screw 50. The transportation of the suspension is illustrated in FIG. 1*a* by straight arrows. The space 70 is gradually reduced from the first end 101 to the second end 102 due to e.g. a tapered shape of the screw shaft. Further, as the suspension is transported from the first end 101 to the second end 102 by the rotation of the screw 50, the suspension is pressed together due to the gradually reduced space 70, and hereby the liquid is removed from the suspension by being pressed through the perforations of the container 40 and out into a second space 20 formed between the container 40 and the housing 10. Right-angled arrows show how removed liquid is led through the second space 20 between the container 40 and the housing to the liquid outlet 15 and out of the apparatus 100.

The suspension deposited in the inlet 11 of the first end 101 may comprise cellulosic material (fibers) such as pulp, paper, recycled paper, sawdust, wood shavings, wood ships, sludge, slurry or wood byproducts. The suspension deposited in the inlet 11 may comprise about 5 to 10% by weight of organic material, such as cellulosic material. The apparatus 100 may be used for treatment of any kind of suspension comprising organic material and liquid. The organic material may be any solid particles/fibers suspended in a liquid.

Figure 6:
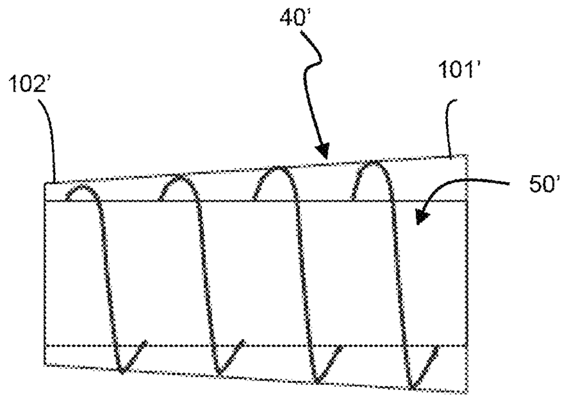
FIG. 6 is a schematic view of a tapered container with a cylindrical screw shaft.

According to an embodiment, the screw shaft is tapered in a direction from the second end 102 to the first end 101, and the container 40 is cylindrical. As the screw shaft is tapered from the second 102 to the first 101 end and the container is cylindrical, the space 70 between the screw and the container 40 is decreasing from the first 101 to the second 102 end. When the suspension is conveyed through the space 70 from the first 101 to the second end 102, liquid is squeezed out due the gradually decreasing space 70 between the screw 50 and the container 40. In another embodiment shown in FIG. 6, the container 40' is a tapered container in a direction from the first end 101' to the second end 102' and the screw shaft of the screw 50' is cylindrical, so that the same effect of reducing the space 70 from the first end 101 to the second end 102 is achieved. The screw 50' may comprise gradually narrowing flight pitches.

The container 40 may comprise one or a plurality of container units 40*a*, 40*b* . . . 40*n* longitudinally connected. The one or plurality of container units 40*a*, 40*b* . . . 40*n* may be cylinders. The plurality of container units may simplify production and replacement of the container. An easier assembly and/or transportation of the container 40 may be achieved by the plurality of container units. A reduction cost during maintenance or assembly of the container 40 may be achieved by the plurality of container units 40*a*, 40*b* . . . 40*n*.

The discharged suspension released at the outlet 12 comprises a higher concentration of the suspension than the material at the inlet. The discharged suspension may comprise about 15 to 40% by weight of suspension, preferably about 25 to 35% by weight.

The apparatus 100 may be connected into a system. In such a system, the outlet 12 at the second end 102 may be connected to a plug screw for further processing of the suspension comprising an organic material and liquid. The outlet 12 at the second end 102 may be connected to a shredder. The outlet 12 at the second end 102 may be connected to a preheater. The outlet 12 at the second end 102 may be connected to a plug screw, a shredder, a preheater or any combination thereof.

Figure 2:
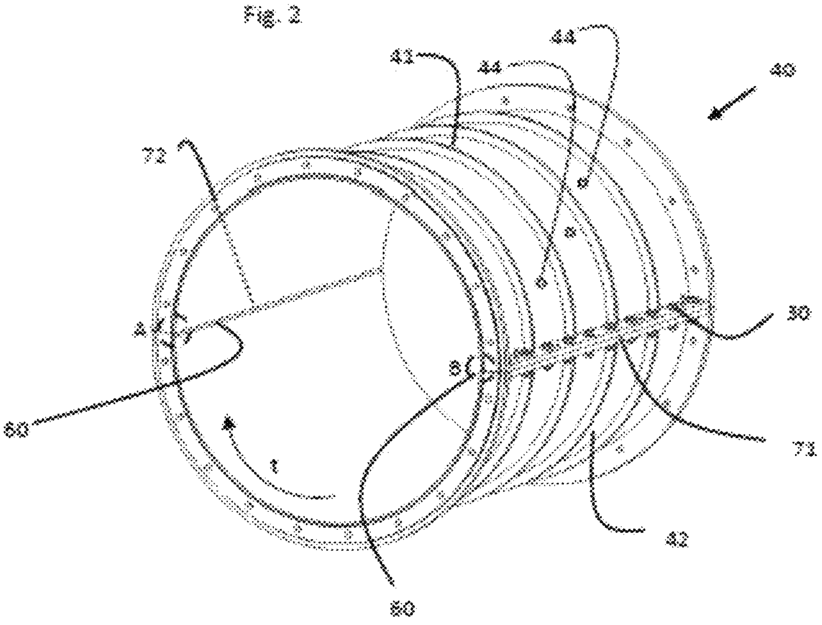
FIG. 2 is a perspective view of a container comprised in an apparatus for processing the suspension comprising an organic material and liquid, according to one embodiment.

FIG. 2 is a more detailed view of any container unit 40*n* of the container 40 comprising a plurality of perforations (not shown for clarity). The container unit 40*n* or the whole container 40 may comprise a first part 41 and a second part 42 connected by connections 71, 72. The container 40 may comprise a longitudinally extending first part 41 and second part 42 assembled into longitudinally extending connections 71, 72 between the first and second part. In a preferred embodiment, the first and second parts 41, 42 are half cylinders that are assembled into a container 40 in the shape a cylinder with circular or substantially circular cross-sectional shape. The connections 71, 72 between the first 41 and second 42 parts may each generate a tooth 60 on the inner surface of the container 40. The tooth 60 may longitudinally extend through the container 40 from first end 101 to second end 102. The first 41 and second 42 parts may be fixed together by fastening devices 30. These fastening devices 30 may be selected from screws, nails and/or bolts or any other suitable fastening device.

During transportation of the suspension comprising the organic material in the container 40, the suspension may rotate in a direction t by the rotation of the screw in the same direction t. The container 40 on FIG. 2 may be one of a plurality of cylinders 40*a*, 40*b* . . . 40*n* longitudinally connected. The container 40 may also be tapered from the first end 101 to the second end 102, preferably having a conical or substantially conical shape.

Figure 3A:
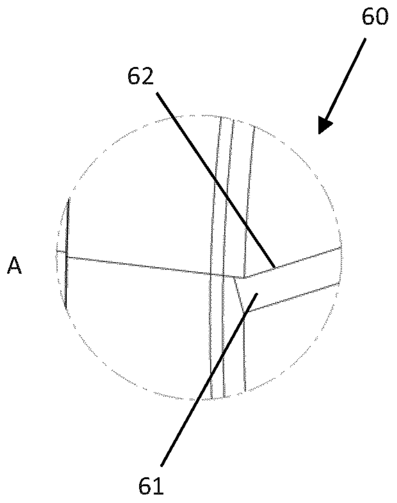
FIGS. 3*a* and 3*b* are detailed views of a tooth of a container, according to one embodiment.
Figure 3B:
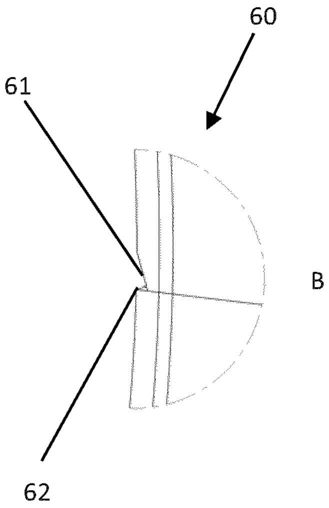

FIGS. 3*a* and 3*b* are detailed views of the sections A and B from FIG. 2 having a tooth 60. The tooth 60 is generated by the connection between a sharp edge 62 of one of the first part 41 and the second part 42 together with a beveled edge 61 of the other of the first 41 and second part 42. The tooth 60 may be generated through the whole longitudinally extension of the container 40. Alternatively, the tooth 60 may be generated on part of the container 40, preferably from the middle to the second end 102 of the container 40, more preferably on a last segment of the container 40 closer to the second end 102.

Through the beveling of the beveled edge 61, the beveled edge forms a groove in the inner surface of the container 40, a groove that abruptly ends at the sharp edge 62. Hereby, the sharp edge will form the tooth 60 that prevents rotation of the suspension. To achieve the beveled edge, a part of the container 40 was taken away from an originally circular cross section thereby causing the groove in the inner surface. The beveled edge may have a variety of shapes and/or angles adapted to generate an anti-rotation tooth 60 structure at the sharp edge 62. The beveled edge 61 may have its deepest extension into the container 40 closest to the sharp edge 62. The beveled edge may gradually go deeper into the container the closer it gets to the sharp edge 62. For instance, the beveled edge 61 may comprise a flat surface, i.e. were the beveled edge's depth into the container constantly increases the closer to the sharp edge. Alternatively, the beveled edge 61 may comprise a spherical or ellipsoidal surface. Still alternatively, the beveled edge 61 may comprise two surfaces generating an internal angle, for instance of 90 degrees. As an example, the furthest away from the sharp edge 62, the beveled edge 61 extends radially from the original surface of the container into the container, and then the beveled edge 61 extends further in a circumferential direction towards the sharp edge 62. The beveled edge 61 may comprise any shape adapted to generate a tooth 60 at the sharp edge 62 having an anti-rotation structure.

The location of the tooth 60 on at least one of the connections 71, 72 simplifies the production and/or reduces production costs compared to for example having tracks made in the inner surface of the container outside the connections. The location of the tooth 60 on at least one of the connections 71, 72 advantageously generates the anti-rotation structure in the container 40 where there would have been no perforations for the passage of the liquid anyhow. Therefore, no reduction of dewatering surface is observed. The tooth 60 forming an indentation on the inner surface of the container 40 advantageously allows having a full diameter screw, which is not possible when using projections such as frames/bars on this inner surface. The tooth 60 therefore may increase the efficiency of the apparatus. The tooth generated on one of the connections 71, 72 may have one sharp edge 62 against the direction of rotation t of the suspension. The teeth generated on both connections 71, 72 may have both sharp edges 62 against the direction of rotation t of the suspension. This tooth position may reduce the rotation of the suspension in the space 70. The tooth 60 may provide an anti-rotation structure and the tooth 60 may be longitudinally extending through the container 40, preferably closer or adjacent to the outlet 12 at the second end 102. In a variation of this embodiment, the sharp edges 62 may be coated with hard metals and/or hard coatings to increase the wear resistance of the sharp edges 62.

Figure 4A:
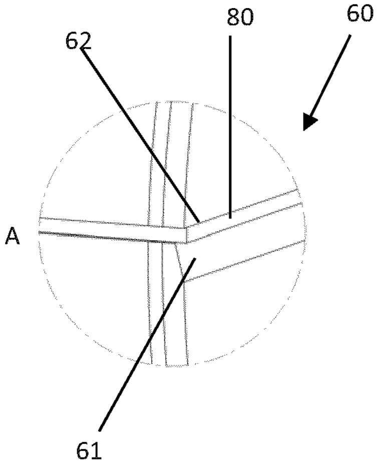
FIGS. 4*a* and 4*b* are detailed views of a tooth of a container comprising a wear plate, according to one embodiment.
Figure 4B:
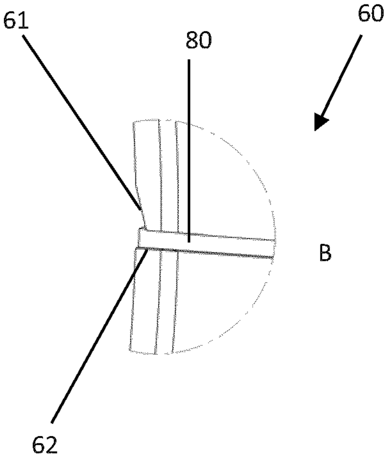

FIGS. 4*a* and 4*b* are respectively detailed views of another embodiment of the sections A and B of FIG. 2 having the tooth 60 on the inner surface of the container 40. In this embodiment, a wear plate 80 is arranged between the sharp edge 62 and the beveled edge 61. The wear plate 80 may comprise a sharp edge. In this embodiment, the wear plate would take the role of the tooth 60 that reduces the rotation of the suspension. The wear plate 80 may be a replaceable wear plate. The wear plate 80 and the container 40 may comprise different materials. The wear plate material may be selected from variants of different steel qualities preferable with good wear resistance. The wear plates may also be equipped with different types of hard metals and/or hard coatings.

The replaceable wear plate 80 may be arranged between the first part 41 and second part 42, preferably between the sharp edge 62 and the beveled edge 61. It is known that sharp edges on the inner surface of the container 40 may be subjected to strong shear, abrasion and/or friction forces during the transport of the suspension comprising an organic material and liquid. Those friction forces may damage the sharp edges and therefore a replacement may be needed, which increase maintenance costs. This embodiment advantageously provides an easy, simple and cheap way to substitute the sharp edges with no need to substitute the whole or part of the container 40. The location of the wear plate 80 in between the first and second parts 41, 42 also provides a simple replacement operation and reduces costs.

Figure 5A:
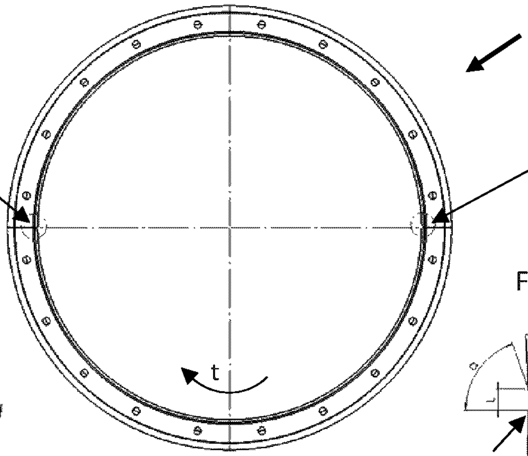
FIG. 5*a* is a cross-section view of a container comprised in an apparatus, according to one embodiment.
Figure 5B:
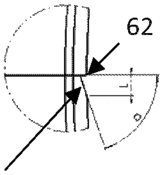
FIGS. 5*b* and 5*c* show a detailed cross-section view of the tooth, according to one embodiment.
Figure 5C:
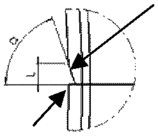

FIG. 5*a* shows a cross-section view of an embodiment of the container 40 having two teeth on diametrically opposed regions at the connections 71, 72 between the first and second parts 41, 42. The suspension comprising an organic material and liquid is transported by the rotation of the screw (omitted for clarity) on a direction t. The rotation of the screw may also rotate the suspension on the same direction t. FIGS. 5*b* and 5*c* show a detailed view of the tooth 60 on diametrically opposed regions. Both sharp edges 62 at the teeth 60 may be pointed against the rotation direction t of the suspension. When the suspension is rotated in the direction t, this rotation may move the suspension against the sharp edges 62, i.e., in a direction from the beveled edge 61 to the adjacent sharp edge 62. In the embodiment shown in FIGS. 5*b* and 5*c*, the beveled edge is a straight edge, the beveled edge forming an angle $\alpha$ with a radial direction of the container, a being smaller than 90 degrees. Also, the length of the beveled edge along the rotational direction t is denoted as L.

The apparatus has been described in preferred embodiments as a screw press. Nevertheless, the novel apparatus comprising at least one tooth 60 generated by a combination between a sharp edge 62 and a beveled edge 61 at a connection 71, 72 between a longitudinally extending first and second part 41, 42 may be advantageously utilized in other apparatuses of a system for processing the suspension comprising an organic material and liquid. In one exemplary embodiment, a plug screw may comprise the tooth 60 described on previous embodiments.

A plug screw is normally arranged downstream a screw press in a production line. The function of the plug screw is to create a plug of the suspension in the plug screw before the suspension enters a preheater. The reason for creating a plug of the suspension is that in the preheater, hot steam is inserted into the production line. Thanks to creating such a plug, the hot steam is kept within the production line and does not risk to exit the production line upstream. The plug screw may be arranged with at least a part of its container being tapered in a direction towards its second, downstream end, thereby more efficiently create a plug of the suspension. The plug is released again when the suspension enters a so called shredder, which is arranged between the plug screw and the preheater.

In case the apparatus of the invention is realized as a plug screw, the container 40 does not comprise a plurality of perforations, i.e. it has no perforations. In other words, a plug screw according to any of the previous embodiments comprises a container 40 with no plurality of perforations, whereby the hot steam is able to stay in the plug screw and does not exit through any perforations.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. Svedberg discloses an apparatus (FIG. 1) for processing a suspension comprising organic material and liquid, the apparatus comprising:

a housing comprising an inlet at a first end for receiving the suspension and an outlet at a second end for discharging the suspension;

a container arranged within the housing;

a screw comprising a screw shaft and flights arranged within the container, the screw shaft defining a rotational axis along a longitudinal extension of the apparatus, the apparatus extending from the first to the second end;

a space defined between the screw and the container, through which the suspension is longitudinally transportable from the first end to the second end by a rotation of the screw, the screw and the container being arranged so that the space is tapered from the first end to the second end, wherein the container comprises a longitudinally extending first part and a longitudinally extending second part which are assembled into longitudinally extending first and second connections between the first part and the second part;

the first part comprising a beveled edge at the first connection;

the second part comprising a sharp edge at the first connection;

whereby the first connection between the first part and second part generating a tooth (60) on an inner surface of the container, wherein the tooth is configured to reduce a rotation of the organic material suspension.

2. The apparatus according to claim 1, wherein the container further comprises a plurality of perforations whereby liquid from the suspension received at the inlet is displaceable out of the container and concentrated organic material is discharged at the outlet.

3. The apparatus according to claim 1, wherein the first part further comprises a sharp edge at the second connection and the second part further comprises a beveled edge at the second connection, whereby the second connection generating a tooth on the inner surface of the container.

4. The apparatus according to claim 1, wherein the tooth generated on the inner surface of the container is only located on part of the container.

5. The apparatus according to claim 1, wherein the container is a cylindrical container and the screw shaft tapers from the second end to the first end.

6. The apparatus according to claim 1, wherein the container tapers from the first end to the second end and the screw shaft is a cylindrical screw shaft.

7. The apparatus according to claim 1, wherein the first connection further comprises a replaceable wear plate comprising a sharp edge, the wear plate being arranged between the first part and the second part.

8. The apparatus according to claim 7, wherein the wear plate material is selected from different types of hard metals and/or coatings.

9. The apparatus according to claim 1, wherein the beveled edge of the first part bears against the sharp edge of the second part.

10. The apparatus according to claim 1, wherein the container further comprises a plurality of longitudinally extending container units arranged end to end.

11. A method for processing a suspension comprising organic material and liquid in an apparatus comprising:

a housing comprising an inlet at a first end for receiving the suspension and an outlet at a second end for discharging the suspension;

a container arranged within the housing;

a screw comprising a screw shaft and flights arranged within the container, the screw shaft defining a rotational axis along a longitudinal extension of the apparatus, the apparatus extending from the first to the second end;

a space defined between the screw and the container, through which the suspension is longitudinally transportable from the first end to the second end by a rotation of the screw, the screw and the container being arranged so that the space is tapered from the first end to the second end, wherein the container comprises a longitudinally extending first part and a longitudinally extending second part which are assembled into longitudinally extending first and second connections between the first part and the second part;

the first part comprising a beveled edge at the first connection;

the second part comprising a sharp edge at the first connection;

whereby the first connection between the first part and second part generating a tooth (60) on an inner surface of the container, the method comprising:

adding the suspension in the inlet;

conveying the suspension from the first end to the second end through the space by rotation of the screw, and collecting the suspension at the outlet;

wherein as the suspension is conveyed, a radial rotation of the suspension in relation to the container is at least reduced by the tooth.

12. The method according to claim 11, wherein the container comprises a plurality of perforations through which at least a part of the liquid is separated from the suspension as the suspension is conveyed from the first end to the second end.

13. The method according to claim 11, wherein the suspension comprises recycled paper, pulp, sawdust, wood shavings, or wood chips, sludge or slurry.

14. The method according to claim 12, wherein the suspension collected at the outlet has organic material concentration from 15 to 40% by weight.

* * * * *